(12) United States Patent
Song

(10) Patent No.: US 8,801,022 B2
(45) Date of Patent: Aug. 12, 2014

(54) FOLDING TYPE BICYCLE

(75) Inventor: Joon Kyu Song, Gyeonggi-do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 63 days.

(21) Appl. No.: 13/520,129

(22) PCT Filed: Dec. 23, 2010

(86) PCT No.: PCT/KR2010/009277
§ 371 (c)(1),
(2), (4) Date: Jun. 29, 2012

(87) PCT Pub. No.: WO2011/081359
PCT Pub. Date: Jul. 7, 2011

(65) Prior Publication Data
US 2012/0273287 A1 Nov. 1, 2012

(30) Foreign Application Priority Data

Dec. 29, 2009 (KR) .................. 10-2009-0132288
Sep. 14, 2010 (KR) .................. 10-2010-0089775

(51) Int. Cl.
B62K 19/00 (2006.01)
B62K 15/00 (2006.01)

(52) U.S. Cl.
USPC ........................................ 280/278; 280/287

(58) Field of Classification Search
USPC ................................................ 280/278, 287
See application file for complete search history.

(56) References Cited

U.S. PATENT DOCUMENTS

| 6,267,401 B1 * | 7/2001 | De Jong ................. 280/287 |
| 6,364,335 B1 * | 4/2002 | Mombelli ............... 280/287 |
| 7,156,780 B1 * | 1/2007 | Fuchs et al. .............. 482/92 |
| 2012/0202649 A1 * | 8/2012 | Huber ...................... 482/2 |

FOREIGN PATENT DOCUMENTS

| DE | 44 23 647 A1 | 1/1996 |
| KR | 20-2009-0013026 A | 12/2009 |
| WO | 93/21055 A1 | 10/1993 |
| WO | 03/055736 A1 | 7/2003 |

OTHER PUBLICATIONS

Extended European Search Report issued in European Patent Application No. EP 10841191.9 dated May 10, 2013.

* cited by examiner

Primary Examiner — Joseph M Rocca
Assistant Examiner — Marlon Arce
(74) Attorney, Agent, or Firm — McDermott Will & Emery LLP

(57) ABSTRACT

A folding type bicycle capable of allowing the user to conveniently fold the bicycle, and having a minimal volume in a folded state is disclosed. The folding type bicycle includes a frame including a front frame, to which a front wheel and a handle are mounted, a center frame, to which pedals are mounted, and a rear frame, to which a rear wheel is mounted. At least one of the front, center, and rear frames includes a hinge plate bent from one end of the at least one frame. The front, center, and rear frames are pivotally coupled through the hinge plate.

21 Claims, 6 Drawing Sheets

FOLDING TYPE BICYCLE

RELATED APPLICATIONS

This application is the U.S. National Phase under 35 U.S.C. §371 of International Application No. PCT/KR2010/009277, filed on Dec. 23, 2010, which in turn claims the benefit of Korean Patent Application Nos. 10-2009-0132288, filed on Dec. 29, 2009 and 10-2010-0089775, filed on Sep. 14, 2010, the disclosures of which Applications are incorporated by reference herein.

TECHNICAL FIELD

Embodiments of the present invention relate to a bicycle, and, more particularly, to a bicycle configured to be foldable for convenient storage and transport.

BACKGROUND ART

A bicycle, which is a short-distance form of travel, is widely used for exercise or recreation.

Generally, such a bicycle includes a frame constituting a skeleton of the bicycle. The bicycle also includes wheels, pedals, and a handle, which are mounted to the frame.

In such a conventional bicycle, however, the frame has a unibody structure. For this reason, there may be inconvenience in storage and transport. In order to solve this problem, bicycles, which have a foldable frame, have recently been developed.

DISCLOSURE OF INVENTION

Technical Problem

It is an aspect of the present invention is to provide a bicycle having a structure allowing the user to easily and conveniently fold the bicycle.

Another aspect of the present invention is to provide bicycle having a foldable structure capable of minimizing the volume of the bicycle in a folded state of the bicycle.

Another aspect of the present invention is to provide a bicycle having a foldable structure allowing the user to conveniently carry the bicycle in a folded state.

Solution to Problem

In accordance with one aspect of the present invention, a folding type bicycle includes a frame, wherein the frame comprises a front frame, to which a front wheel and a handle are mounted, a center frame, to which pedals are mounted, and a rear frame, to which a rear wheel is mounted, at least one of the front, center, and rear frames includes a hinge plate bent from one end of the at least one frame, and the front, center, and rear frames are pivotally coupled through the hinge plate.

The center frame may include a saddle frame to mount a saddle thereto.

The hinge plate may be coupled through a hinge shaft.

The folding type bicycle may further include a fixing unit to prevent pivotal movement of the frames.

The fixing unit may include a first cam member having a first mountain portion protruded from one surface of the first cam member, and a first valley portion formed at the surface of the first cam member while being adjacent to the first mountain portion, and a second cam member having a second valley portion formed at one surface of the second cam member, to engage with the first mountain portion, and a second mountain portion formed at the surface of the second cam member, to engage with the first valley portion.

The first and second cam members may be coupled to be pivotable about the hinge shaft. The second cam member may be provided, at an outer circumferential surface thereof, with a lever to pivot the second cam member about the hinge shaft.

The lever may include at least one bent portion.

The first cam member may be coupled to one surface of the hinge plate, which is provided at the front or rear frame.

The first cam member may include a fixing protrusion. The hinge plate, which is provided at the front or rear frame, may include a fixing groove to engage with the fixing protrusion.

The first came member may be formed to be integrated with the hinge plate, which is provided at the front or rear frame.

The hinge plate may be provided with a shaft hole to allow the hinge plate to be coupled with the hinge shaft.

A rotation preventing protrusion may be formed at one of the hinge shaft and the shaft hole provided at the hinge plate. A rotation preventing groove having a shape corresponding to the rotation preventing protrusion may be formed at the other one of the hinge shaft and the shaft hole.

A stopper may be provided at the hinge plate, to limit a pivotal movement angle of the hinge plate.

The stopper may include a protrusion protruded from one surface of the hinge plate, and a guide groove provided at an inner circumferential surface of the hinge plate. The guide groove may include a guide rail to guide movement of the protrusion, and steps to limit the movement of the protrusion.

The folding type bicycle may further include an electric generator mounted to the center frame, to generate electrical energy during rotation of the pedals, a motor mounted to the rear wheel, a battery to store the electrical energy generated by the electric generator, a battery management system to manage the battery, and an electronic control unit (ECU) electrically connected to the electric generator, the motor, the battery, and the battery management system. At least one of the electric generator, the battery, the battery management system, and the ECU may be mounted to the rear frame.

The front frame may include a first hinge plate. The center and saddle frames may include a second hinge plate in common. The rear frame may include a third hinge plate.

The center and saddle frames may be arranged to be spaced apart from each other about the second hinge plate by a predetermined angle.

At least two of the first, second, and third hinge plates may be provided, at one-side surfaces thereof, with teeth, and are in contact with each other while engaging with each other through the teeth.

A distance between a rotation center of the front wheel and the hinge shaft may be equal to a distance between the hinge shaft and a rotation center of the rear wheel.

In accordance with another aspect of the present invention, a folding type bicycle includes a frame, wherein the frame includes a front frame, to which a front wheel and a handle is mounted, a center frame, to which pedals are mounted, a saddle frame, to which a saddle is mounted, and a rear frame, to which a rear wheel is mounted, at least one of the front, center, saddle and rear frames comprises a hinge plate bent from an associated one of the at least one frame, and the front, center, saddle, and rear frames are pivotally coupled through the hinge plate.

Advantageous Effects of Invention

In accordance with the aspects of the present invention, the user may easily fold the bicycle.

Also, the bicycle has a minimal volume in a folded state.

In addition, the user may conveniently carry the bicycle in a folded state.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

Hereinafter, preferred embodiments of the present invention will be described in detail with reference to the annexed drawings.

Figure 1:
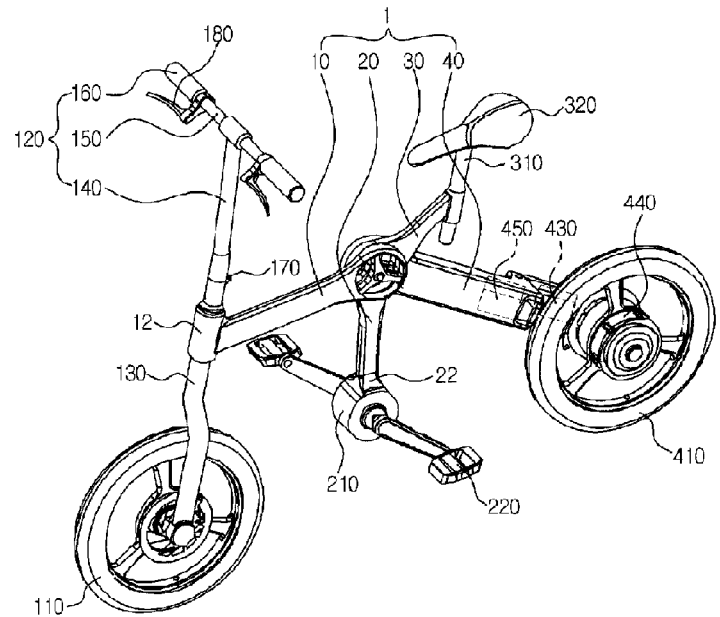
FIG. 1 is a perspective view of a folding type bicycle according to an exemplary embodiment of the present invention.
Figure 2:
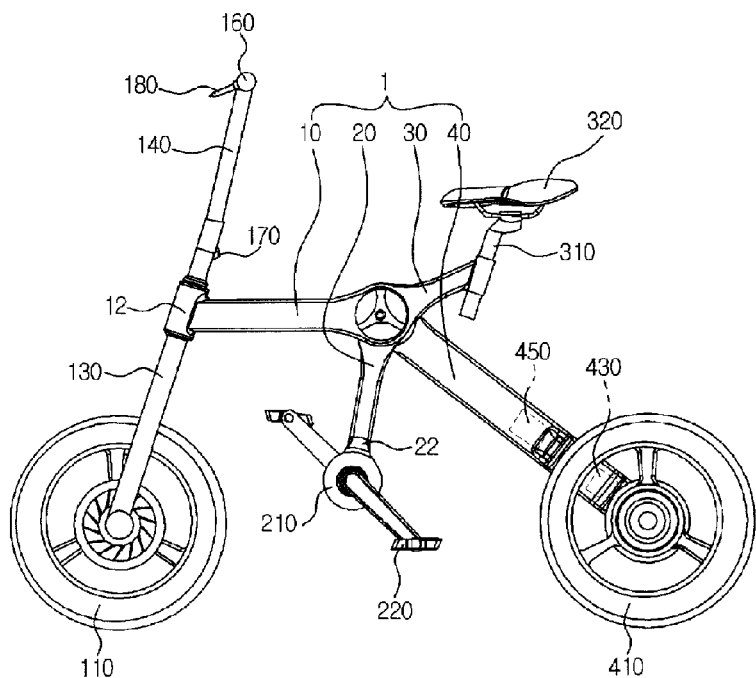
FIG. 2 is a side view of the folding type bicycle shown in FIG. 1.
Figure 3:
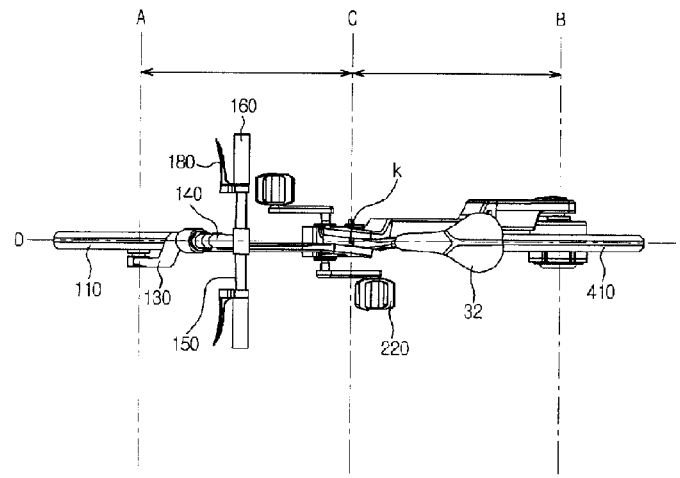
FIG. 3 is a plan view of the folding type bicycle shown in FIG. 1.
Figure 4:
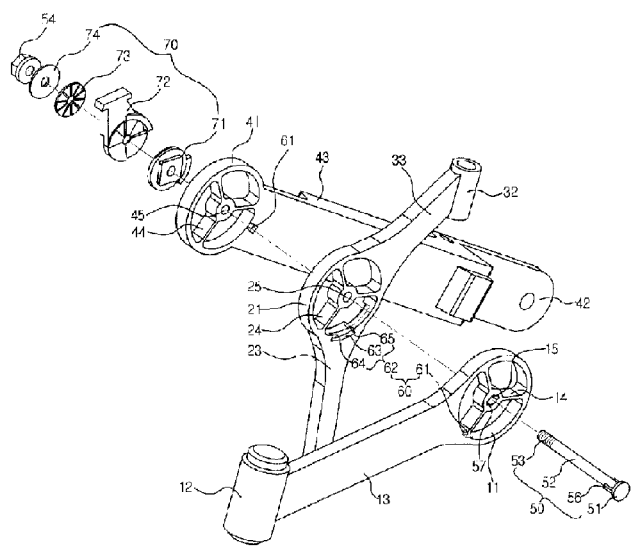
FIG. 4 is a perspective view illustrating a coupled state of a frame included in the folding type bicycle in accordance with an exemplary embodiment of the present invention.
Figure 5:
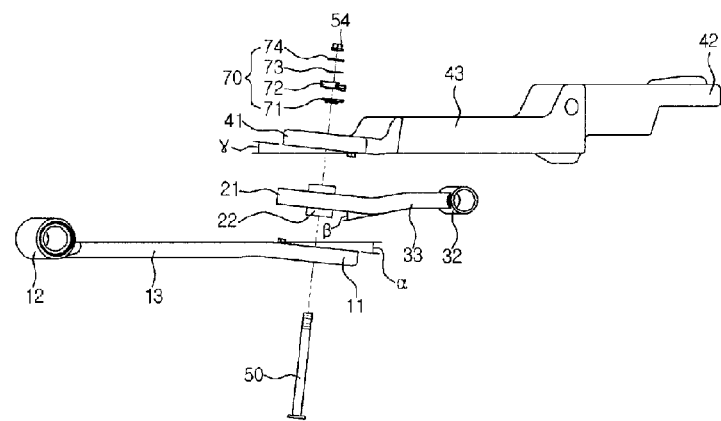
FIG. 5 is a plan view illustrating the frame included in the folding type bicycle in accordance with the illustrated embodiment of the present invention.

FIG. 1 is a perspective view of a folding type bicycle according to an exemplary embodiment of the present invention. FIG. 2 is a side view of the folding type bicycle shown in FIG. 1. FIG. 3 is a plan view of the folding type bicycle shown in FIG. 1. FIG. 4 is a perspective view illustrating a coupled state of a frame included in the folding type bicycle in accordance with an exemplary embodiment of the present invention. FIG. 5 is a plan view illustrating the frame included in the folding type bicycle in accordance with the illustrated embodiment of the present invention.

As shown in FIGS. 1 to 5, the folding type bicycle according to the illustrated embodiment of the present invention includes a frame 1. The frame 1 includes a front frame 10, a center frame 20, a saddle frame 30, and a rear frame 40. The front frame 10, center frame 20, saddle frame 30, and rear frame 40 are pivotally coupled.

The front frame 10 includes a first hinge plate 11, a head tube 12, and a first connector 13 to connect the first hinge plate 11 and head tube 12.

The first hinge plate 11 has a substantially circular shape. The first hinge plate 11 is provided at one end of the front frame 10 such that it is bent from the front frame 10 by a predetermined angle α. The bending angle α may be 5° to 20° (FIG. 5).

First reinforcing ribs 14 are provided at the inside of the first hinge plate 11, to reinforce the first hinge plate 11. A first shaft hole 15 is formed at the center of the first reinforcing ribs 14, to receive a hinge shaft 50.

The head tube 12 has a cylindrical shape. The head tube 12 is provided at the other end of the front frame 10.

The head tube 12 is coupled with a handle stay 130. A bearing (not shown) is mounted on an inner circumferential surface of the head tube 12. Accordingly, the head tube 12 functions to support the handle stay 130 such that the handle stay 130 rotates on the inner circumferential surface of the head tube 12.

The handle stay 130 is configured to have a function for connecting a handle 120 and a front wheel 110 to the front frame 10. The handle stay 130 is coupled, at an upper end thereof, to the handle 120 while being coupled, at a lower end thereof, with the front wheel 110.

The lower end of the handle stay 130 has a bent shape, in order to rotatably support the front wheel 110 at one side of the front wheel 110. The bending width of the lower end of the handle stay 130 may be equal to or slightly greater than the width of the front wheel 110.

The lower end of the handle stay 130 may have a structure capable of rotatably supporting the front wheel 110 at both sides of the front wheel 110, as in general bicycles.

The handle 120 includes a handle stem 140 coupled to the upper end of the handle stay 130, a handlebar 150 coupled to the handle stem 140, and a handle grip 160 provided at the handlebar 150.

The handle stem 140 has a round tube shape. The handle stem 140 is connected, at one end thereof, to the handle stay 130 while being connected, at the other end thereof, to the handlebar 150.

The handle stem 140 is connected to the handle stay 130 through a first hinge 170. Accordingly, the handle stem 140 can be folded with respect to the handle stay 130 about the first hinge 170.

The handlebar 150 has a round tube shape. The handlebar 150 functions to connect handle grips 160 to the handle stem 140.

The handle grips 160 are configured to allow a rider to steer the bicycle while gripping the handle grips 160.

A brake lever 180 is provided at one end of each handle grip 160, to allow the rider to stop the bicycle while steering the bicycle.

The brake lever 180 is arranged so as to be easily grasped by the fingers of the rider when the rider spreads out the fingers in a state of gripping the handle grip 160.

An adjusting unit (not shown) may be provided at one of the handle grips 160, to adjust the driving speed of a motor 440 while adjusting a pedal force applied to an electric generator 210. The adjusting unit (not shown) is electrically connected to an electronic control unit (ECU) 430.

The center frame 20 includes a second hinge plate 21, a pedal coupler 22, and a second connector 23 to connect the second hinge plate 21 and pedal coupler 22.

The second hinge plate 21 has a substantially circular shape. The second hinge plate 21 is provided at one end of the center frame 20 such that it is bent from the center frame 20 by a predetermined angle.

Second reinforcing ribs 24 are provided at the inside of the second hinge plate 21, to reinforce the second hinge plate 21. A second shaft hole 25 is formed at the center of the second reinforcing ribs 24, to receive the hinge shaft 50.

The pedal coupler 22 is provided at the other end of the center frame 20. The electric generator 210 is arranged in the pedal coupler 22. Pedals 220 are rotatably mounted at opposite ends of a rotating shaft (not shown) connected to the electric generator 210.

When the rider rotates the pedals 220, the rotating force of the pedals 220 is converted into electrical energy by the electric generator 210. The electrical energy from the electric generator 210 is stored in a main battery 450 electrically connected to the electric generator 210.

The saddle frame 30 is integrated with the center frame 20 and the second hinge plate 21 provided at one end of the center frame 20. The center frame 20 and saddle frame 30 are arranged in a state of being spaced apart from each other by a predetermined angle β about the second hinge plate 21 while holding the second hinge plate 21 in common. The angle β defined between the second hinge plate 21 and the saddle frame 30 may be 5° to 20° (FIG. 5).

The saddle frame 30 includes a saddle coupler 32, and a third connector 33 to connect the second hinge plate 21 and saddle coupler 32.

The saddle coupler 32 has a cylindrical shape. The saddle coupler 32 is provided at the other end of the saddle frame 30.

The saddle coupler 32 is coupled, at an inner circumferential surface thereof, with an outer circumferential surface of an auxiliary saddle frame 310, to guide and support the auxiliary saddle frame 310 such that the auxiliary saddle frame 310 is upwardly and downwardly movable.

The auxiliary saddle frame 310 has a cylindrical bar shape. The auxiliary saddle frame 310 is connected, at one end thereof, to the saddle coupler 32 while being connected, at the other end thereof, to a saddle 320.

Since the auxiliary saddle frame 310 is connected to the saddle coupler 32, to be upwardly and downwardly movable, it may be possible to adjust the level of the saddle 320 by upwardly or downwardly moving the auxiliary saddle frame 310.

A clamping unit (not shown) may be provided at the outer circumferential surface of the auxiliary saddle frame 310, in order to prevent the auxiliary saddle frame 310 from being downwardly moved by the weight of the rider when the rider sits on the saddle 320.

A sliding unit (not shown) is mounted between the auxiliary saddle frame 310 and the saddle 320, to allow the rider to adjust the spacing between saddle 320 and the handle 120 in accordance with the build of the rider.

The rear frame 40 includes a third hinge plate 41, a rear wheel coupler 42, and a third connector 43 to connect the third hinge plate 41 and rear wheel coupler 42.

The third hinge plate 41 has a substantially circular shape. The third hinge plate 41 is provided at one end of the rear frame 40 such that it is bent from the rear frame 40 by a predetermined angle γ. The bending angle γ may be 5° to 20° (FIG. 5).

Third reinforcing ribs 44 are provided at the inside of the third hinge plate 41, to reinforce the third hinge plate 41. A third shaft hole 45 is formed at the center of the third reinforcing ribs 44, to receive the hinge shaft 50.

The rear wheel coupler 42 is configured and arranged to rotatably support the rear wheel 410 at one side of the rear wheel 410.

The rear wheel coupler 42 may have a structure capable of rotatably supporting the rear wheel 410 at both sides of the rear wheel 410, as in general bicycles.

A battery management system (BMS) (not shown) and an electronic control unit (ECU) 430 may be mounted in the rear wheel coupler 42. Also, the main battery 450, which stores the energy generated by the electric generator 210, may be mounted in the third connector 43 connecting the third hinge plate 41 and rear wheel coupler 42.

The ECU 430 functions to electrically control the main battery 450, BMS (not shown), and motor 440.

The BMS automatically manages batteries while monitoring the state of the batteries, in order to allow the batteries to be used in an ideal fashion. The BMS also functions to estimate when the batteries should be replaced, and to identify a battery that is about to fail.

Meanwhile, it will be appreciated that the main battery 450, BMS (not shown), and ECU 430 may be mounted in the third connector 43, front frame 10, center frame 20, or saddle frame 30, in place of the rear wheel coupler 42.

The motor 440, in which a transmission is mounted, is mounted to the rear wheel 410, in order to rotate the rear wheel 410, thereby moving the bicycle forward.

For the motor 440, a motor, which is of an outer rotor driving type, may be used. Here, the outer rotor driving type means a driving type in which a rotor is arranged around a central shaft, and is connected to a rotating body, to rotate together with the rotating body.

Hereinafter, the coupling relations among the front frame 10, center frame 20, saddle frame 30, and rear frame 40 constituting the folding type bicycle according to the illustrated embodiment of the present invention will be described in detail.

Figure 6:
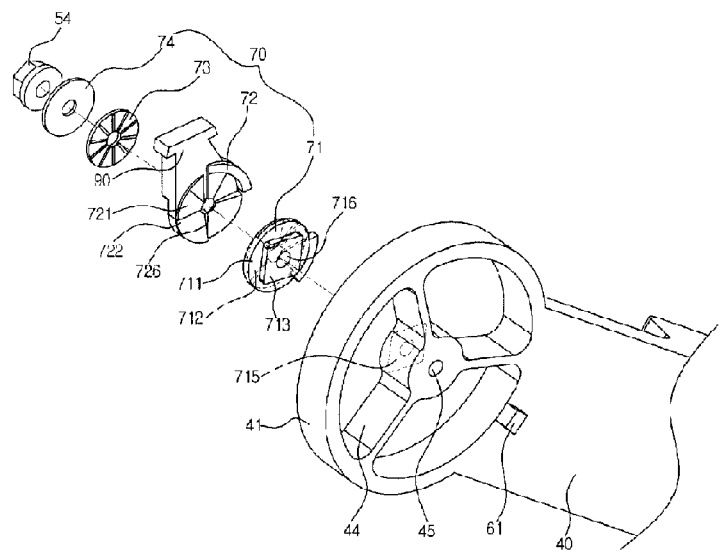
FIG. 6 is a perspective view illustrating a coupled state of a fixing unit according to an exemplary embodiment of the present invention.
Figure 7:
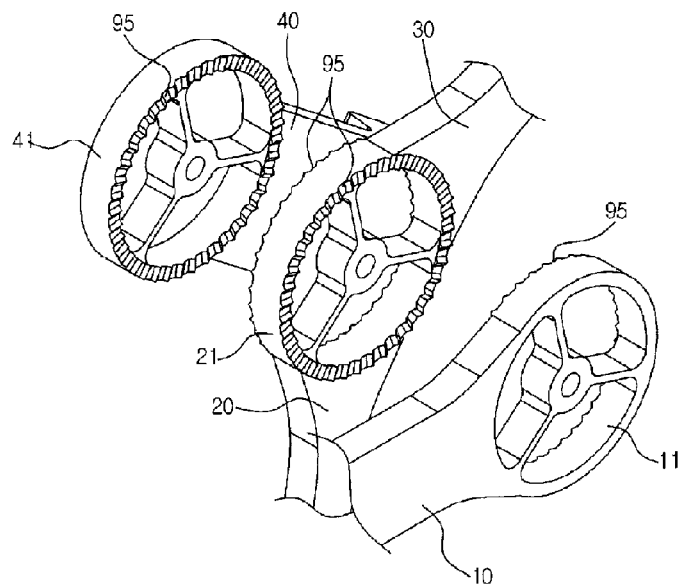
FIG. 7 is a perspective view illustrating the case in which teeth are provided at hinge plates.
Figure 8:
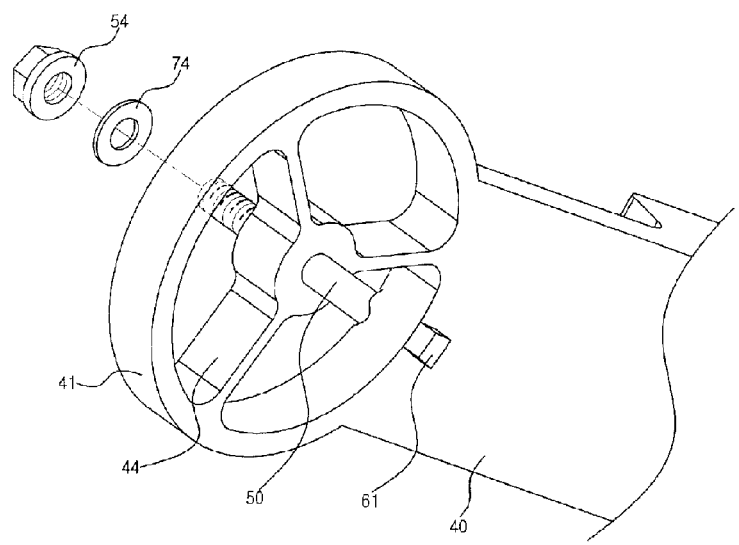
FIG. 8 is a perspective view illustrating a fixing unit according to another exemplary embodiment of the present invention.
Figure 9:
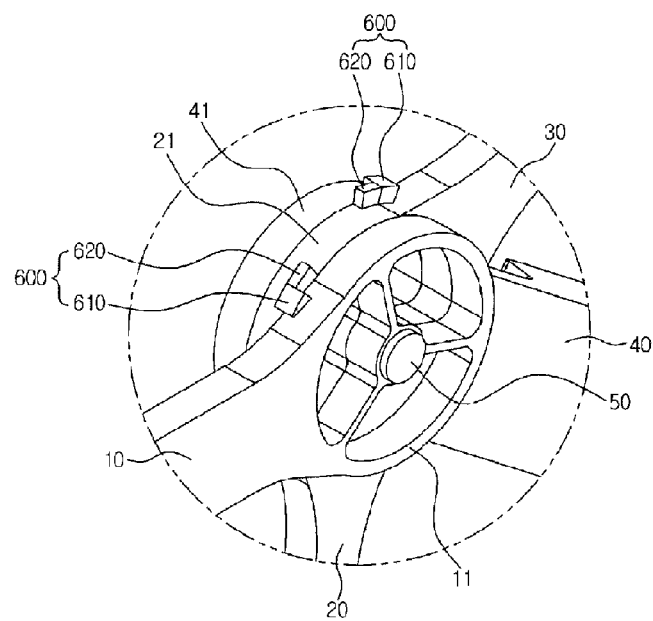
FIG. 9 is a perspective view illustrating a stopper according to another exemplary embodiment of the present invention.
Figure 10:
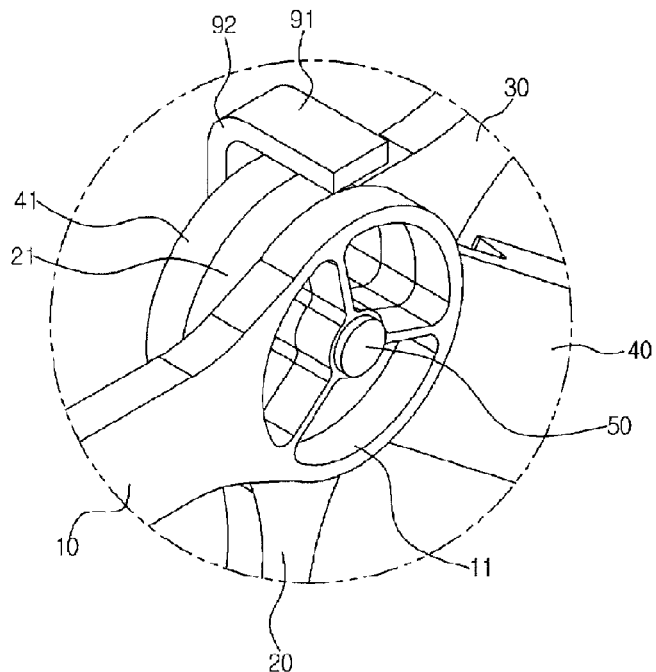
FIG. 10 is a perspective view illustrating a lever according to another embodiment of the present invention.

FIG. 6 is a perspective view illustrating a coupled state of a fixing unit according to an exemplary embodiment of the present invention. FIG. 7 is a perspective view illustrating the case in which teeth are provided at the hinge plates. FIG. 8 is a perspective view illustrating a fixing unit according to another exemplary embodiment of the present invention. FIG. 9 is a perspective view illustrating a stopper according to another exemplary embodiment of the present invention. FIG. 10 is a perspective view illustrating a lever according to another embodiment of the present invention.

As shown in FIGS. 4 to 10, the front frame 10, center frame 20, saddle frame 30, and rear frame 40 are pivotally coupled through the first hinge plate 11, second hinge plate 21, and third hinge plate 41.

In detail, the front frame 10, center frame 20, saddle frame 30, and rear frame 40 are sequentially coupled to the hinge shaft 50 through the first shaft hole 15 provided at the first hinge plate 11, the second shaft hole 25 provided at the second hinge plate 21, and the third shaft hole 45 provided at the third hinge plate 41.

The hinge shaft 50 connects the first hinge plate 11, second hinge plate 21, and third hinge plate 41 to pivot about a common axis. The hinge shaft 50 includes a head portion 51 having a greater diameter than the first shaft hole 15 to third shaft hole 45, an extension portion extending from one end of the head 51 by a predetermined length, and a threaded portion 53 formed at terminal end of the extension portion 52.

The first hinge plate 11, second hinge plate 21, and third hinge plate 41 are in tight contact with one another by the head portion 51, which has a greater diameter than the first shaft hole 15, second shaft hole 25, and third shaft hole 45, and a fastening nut 54 coupled to the threaded portion 53.

Rotation preventing protrusions 56, which have a substantially rectangular shape, are provided at the extension portion 52. The rotation preventing protrusions 56 are inserted into rotation preventing grooves 57, to prevent the hinge shaft 50 from rotating idly in the first shaft hole 15, second shaft hole 25, and third shaft hole 45.

The rotation preventing protrusions 56 may have various shapes. That is, the rotation preventing protrusions 56 may have a polygonal shape to prevent the hinge shaft 50 from rotating idly in the first shaft hole 15, second shaft hole 25, and third shaft hole 45, in place of a rectangular shape.

Also, the head portion 51 of the hinge shaft 50 may have a polygonal shape, and the hinge plates 11, 21, and 41 may have receiving portions (not shown) corresponding to the polygonal head portion 51, respectively, to prevent the hinge shaft 50 from rotating idly in the first shaft hole 15, second shaft hole 25, and third shaft hole 45. In this case, the rotation preventing protrusions 56 formed at the hinge shaft 50 may be dispensed with.

The rotation preventing grooves 57 are formed on at least one of the first shaft hole 15, second shaft hole 25, and third shaft hole 45.

The rotation preventing grooves 57 have a shape corresponding to that of rotating preventing protrusions 56, in order to fit the rotation preventing protrusions 56 therein. The rotation preventing grooves 57 communicate with the inner circumferential surfaces of the first shaft hole 15 to third shaft hole 45.

As described above, the rotation preventing grooves 57 are coupled with the rotation preventing protrusions 56, thereby preventing the hinge shaft 50 from rotating idly in a state of coupling the first hinge plate 11, second hinge plate 21, and third hinge plate 41.

The positions, at which the rotation preventing protrusions 56 and the rotating preventing grooves 57 are provided, may be interchanged. That is, the rotation preventing protrusions 56 may be provided on at least one of the first shaft hole 15, second shaft hole 25, and third shaft hole 45, whereas the rotation preventing grooves 57 may be provided at the hinge shaft 50. In this case, of course, the same effect as that of the above-described case is provided to prevent the hinge shaft 50 from rotating idly in a state of coupling the first hinge plate 11, second hinge plate 21, and third hinge plate 41.

Stoppers 60 are provided at the first hinge plate 11, second hinge plate 21, and third hinge plate 41.

As shown in FIG. 4, the stoppers 60 function to limit the rotation angle of the first hinge plate 11, second hinge plate 21, and third hinge plate 41. Each stopper 60 includes a protrusion 61 and a guide groove 62.

The protrusions 61 are protruded from one-side surfaces of the first and third hinge plates 11 and 41, respectively, whereas the guide grooves 61 are formed at an inner circumferential surface of the second hinge plate 21.

Each guide groove 61 includes a guide rail 63 to guide movement of the corresponding protrusion 61, and first and second engagement steps 64 and 65 to restrict movement of the protrusion 61.

When the rider pivots the first hinge plate 11, second hinge plate 21, or third hinge plate 41, in order to fold or unfold the bicycle in a state in which the first hinge plate 11, second hinge plate 21, and third hinge plate 41 are coupled, each protrusion 61 is moved along the guide rail 63 of the guide groove 61 in a sliding manner.

When the protrusion 61 moving along the guide rail 63 comes into contact with the first engagement step 64 or second engagement step 65 arranged at one end or the other end of the guide rail 63, further movement of the protrusion 61 is prevented. As a result, pivotal movement of the first hinge plate 11, second hinge plate 21, or third hinge plate 41 engaged with the protrusion 61 is prevented.

When the protrusion 61 comes into contact with the first engagement step 64, the bicycle is in a completely unfolded state. On the other hand, when the protrusion 61 comes into contact with the second engagement step 65, the bicycle is in a completely folded state.

Through provision of the stoppers 60 each including one protrusion 61 and one guide groove 62, it may be possible to set relative fixing positions of the frames in a folded or unfolded state of the bicycle. It may also be possible to prevent the frames from rotating from the fixing positions thereof due to impact or weight while riding the bicycle in an unfolded state.

Although the protrusions 61 have been described as being provided at the first and third hinge plates 11 and 41, respectively, and the guide grooves 62 have been described as being provided at the second hinge plate 21, for convenience of description, the protrusions 61 and guide grooves 62 may be provided at various positions.

That is, the guide grooves 62 may be provided at the first and third hinge plates 11 and 41, respectively, and the protrusions 61 may be provided at opposite surfaces of the second hinge plate 21, respectively. On the other hand, one protrusion 61 may be provided at one of the first and third hinge plates 11 and 41, and one guide groove 62 may be provided at the other one of the first and third hinge plates 11 and 41. In this case, another guide groove 62 may be provided at one surface of the second hinge plate 21, and another protrusion 61 may be provided at the other surface of the second hinge plate 21.

Referring to FIG. 9, stoppers according to another embodiment of the present invention are shown. The stoppers may be provided at outer circumferential surfaces of the first hinge plate 11, second hinge plate 21, and third hinge plate 41.

Each stopper 600 according to the embodiment shown in FIG. 9 includes a first engagement protrusion 610 and a second engagement protrusion 620.

The first engagement protrusions 610 of the stoppers 600 are formed at the outer circumferential surfaces of the first and third hinge plates 11 and 41, respectively. On the other hand, the second engagement protrusions 620 of the stoppers 600 are formed at the outer circumferential surface of the second hinge plate 21, to come into contact with the first engagement protrusions 610 respectively formed at the first and third hinge plates 11 and 41.

Each first engagement protrusion 610 may extend in a width direction of the first hinge plate 11 or third hinge plate 41, namely, a longitudinal direction of the hinge shaft 50, by a predetermined length, so as to be engaged with the corresponding second engagement protrusion 620.

The second engagement protrusions 620 are formed at the outer circumferential surface of the second hinge plate 21 at positions rotated about the hinge shaft 50 by predetermined angles, respectively, while being circumferentially spaced apart from each other. In this case, it may be possible to set relative fixing positions of the frames, in order to allow the rider to easily fold or unfold the bicycle, as described above.

A fixing unit 70 is coupled to one surface of the first hinge plate 11 or third hinge plate 41.

The fixing unit 70 functions to fix the first hinge plate 11, second hinge plate 21, and third hinge plate 41 in a close contact state, or to release the fixed state. The fixing unit 70 includes a first cam member 71, a second cam member 72, a bearing 73, and a disc spring 74.

The first cam member 71 is firmly coupled to one surface of the first hinge plate 11 or third hinge plate 41.

The first cam member 71 is formed, at one surface thereof, with first mountain portions 711 protruded from the surface of the first cam member 71 while being spaced apart from one another, and first valley portions 712 arranged between adjacent ones of the first mountain portions 711 and connected to the adjacent first mountain portions 711. The first cam member 71 is also formed with a fixing protrusion 713 at a surface thereof opposite the surface at which the first mountain portions 711 and first valley portions 712 are formed.

The fixing protrusion 713 has a substantially polygonal shape. The fixing protrusion 713 is inserted into a fixing groove 715 provided at one surface of the first hinge plate 11 or third hinge plate 41. Thus, the fixing protrusion 713 functions to fix the first cam member 71 to one surface of the first hinge plate 11 or third hinge plate 41.

Of course, it will be appreciated that the positions of the fixing protrusion 713 and fixing groove 715 may be reversed. That is, the fixing protrusion 713 may be provided at one surface of the first hinge plate 11 or third hinge plate 41, and the fixing groove 715 may be provided at the first cam member 71.

Meanwhile, the first cam member 71 may be formed to be integrated with the first hinge plate 11 or third hinge plate 41. In this case, the first mountain portions 711 and first valley portions 712 are formed at one surface of the first hinge plate 11 or third hinge plate 41, in place of the first cam member 71. In this case, the fixing protrusion 713 and fixing groove 715 may be dispensed with.

A fourth shaft hole 716 is provided at the center of the first cam member 71, to allow the first cam member 71 to be coupled with the hinge shaft 50.

The second cam member 72 is configured to rotate about the hinge shaft 50 in a state of being in surface contact with the first cam member 71. The second cam member 72 is formed, at one surface thereof facing the first cam member 71, with second valley portions 722 to be engaged with the first mountain portions 711, and second mountain portions 721 arranged between adjacent ones of the second valley portions 722 and connected to the adjacent second valley portions 722.

A fifth shaft hole 726 is provided at the center of the second cam member 72, to allow the second cam member 72 to be coupled with the hinge shaft 50.

The bearing 73 and disc spring 74 are sequentially coupled to an outer surface of the second cam member 72, namely, the surface opposite the surface of the second cam member 72 contacting the first cam member 71 (hereinafter, referred to as "the other surface of the second cam member 72").

The bearing 73 is arranged to be in contact with the other surface of the second cam member 72. The bearing 73 supports the second cam member 72 such that the second cam member 72 is axially rotatable. That is, the bearing 73 functions to allow the second cam member 72 to stably rotate about the hinge shaft 50.

For the bearing 73, a thrust bearing having an axial support function may be used.

The disc spring 74 is arranged to be in contact with one surface of the bearing 73. The disc spring 74 axially elastically supports the second cam member 72. Thus, the disc spring 74 functions to allow the second cam member 72 to smoothly rotate about the hinge shaft 50.

That is, when the second cam member 72 rotates, the disc spring 74 elastically supporting the second cam member 72 is compressed. As a result, a gap is formed. By virtue of this gap, the second cam member 72 may smoothly rotate.

In place of the disc spring 74, a standard element such as a disc washer may be used.

The fastening nut 54 is arranged outside the disc spring 74. As described above, the fastening nut 54 functions to prevent the fixing unit 70 from being separated from the hinge shaft 50 as it is coupled to the threaded portion 53 provided at the hinge shaft 50.

Thus, the first cam member 71, second cam member 72, bearing 73, and disc spring 74 constituting the fixing unit 70 are sequentially axially coupled with the hinge shaft 50 outside the first hinge plate 11 or third hinge plate 41.

The spacing between the first cam member 71 and the second cam member 72 is maximized in a state in which the first mountain portions 711 provided at the first cam member 71 and the second mountain portions 721 provided at the second cam member 72 are engaged with each other. At this time, the first cam member 71 is in a state of being maximally urged toward the first hinge plate 11 or third hinge plate 41. Accordingly, the coupling force axially exerted among the first hinge plate 11, second hinge plate 21, and third hinge plate 41 is maximized. As a result, the first hinge plate 11, second hinge plate 21, and third hinge plate 41 are fixed together, so that they cannot rotate.

When external force is applied to the second cam member 72 in the above-described state, to rotate the second cam member 72 about the hinge shaft 50, the second mountain portions 721 are moved with respect to the first mountain portions 711, so that they are separated from the first mountain portions 711.

When external force is further applied to the second cam member 72, the first mountain portions 722 and second valley portions 722, and the first valley portions 712 and second mountain portions 721 are engaged with each other. In this state, the spacing between the first cam member 71 and the second cam member 72 is minimized. In this state, the coupling force axially exerted among the first hinge plate 11, second hinge plate 21, and third hinge plate 41 is reduced. As a result, it may be possible to rotate the first hinge plate 11, second hinge plate 21, and third hinge plate 41 about the hinge shaft 50.

When the second cam member 72 is rotated after the frame 1 has been completely folded or unfolded in accordance with rotation of the first hinge plate 11, second hinge plate 21, and third hinge plate 41, to engage the first mountain portions 711 and second mountain portions 721 with each other, the coupling force axially exerted among the first hinge plate 11, second hinge plate 21, and third hinge plate 41 is again maximized. As a result, the first hinge plate 11, second hinge plate 21, and third hinge plate 41 cannot rotate.

As shown in FIG. 8, the fixing unit may include only the disc spring 74 and fastening nut 54.

In this case, the disc spring 74 is interposed between the first hinge plate 11 or third hinge plate 41 and the fastening nut 54, to directly elastically support the first hinge plate 11 or third hinge plate 41.

When the rider unfastens the fastening nut 54 fastened to the rotating shaft 50, the coupling force axially exerted among the first hinge plate 11, second hinge plate 21, and third hinge plate 41 is reduced. In this state, accordingly, it may be possible to rotate the first hinge plate 11, second hinge plate 21, and third hinge plate 41 about the hinge shaft 50.

When the fastening nut 54 is again fastened after the frame 1 has been completely folded or unfolded in accordance with rotation of the first hinge plate 11, second hinge plate 21, and third hinge plate 41, the coupling force axially exerted among the first hinge plate 11, second hinge plate 21, and third hinge plate 41 is increased. Accordingly, the folded or unfolded state of the bicycle is maintained.

As shown in FIGS. 6 and 10, a lever 90 is provided at an outer circumferential surface of the second cam member 72.

The lever 90 is adapted to allow the rider to conveniently rotate the second cam member 72, in order to fold or unfold the bicycle.

As shown in FIG. 10, the lever 90 may be provided with a knob 91. The knob 91 may have at least one bent portion 92 to allow the rider to conveniently grasp the knob 91.

Although not shown, the lever 90 may have an inverted-U structure in which one end of the lever 90 is coupled to the outer circumferential surface of the second cam member 72, and the other end of the lever 90 is coupled to the head portion 51 of the hinge shaft 50.

As shown in FIG. 7, each of the first hinge plate 11, second hinge plate 21, and third hinge plate 41 may also be formed, at one surface thereof, with teeth 95.

The teeth 95 are repeatedly formed along one surface of each of the first hinge plate 11, second hinge plate 21, and third hinge plate 41. The first hinge plate 11, second hinge plate 21, and third hinge plate 41 are in contact with one another while being engaged with one another through the teeth 95 thereof.

The rider may drive the unfolded bicycle on a rough road or jump over objects while riding on the bicycle. In this case, impact may be momentarily applied to the frame 1 of the bicycle.

When impact is momentarily applied, as described above, even in the state in which the first hinge plate 11, second hinge plate 21, and third hinge plate 41 are firmly axially fastened together by the rotating shaft 50, fixing unit 70, and fastening nut 54, relative rotation may occur among the first hinge plate 11, second hinge plate 21, and third hinge plate 41 (Hereinafter, this phenomenon will be referred to as a "slip phenomenon".).

The teeth 95 of the first hinge plate 11, second hinge plate 21, and third hinge plate 41 are engaged with one another, so that they function as a resistance to reduce the amount of relative rotation among the first hinge plate 11, second hinge plate 21, and third hinge plate 41. Accordingly, it may be possible to prevent occurrence of the above-described slip phenomenon through provision of the teeth 95.

Hereinafter, the principle of unfolding and folding the folding type bicycle according to an exemplary embodiment of the present invention will be described in detail.

Figure 11:
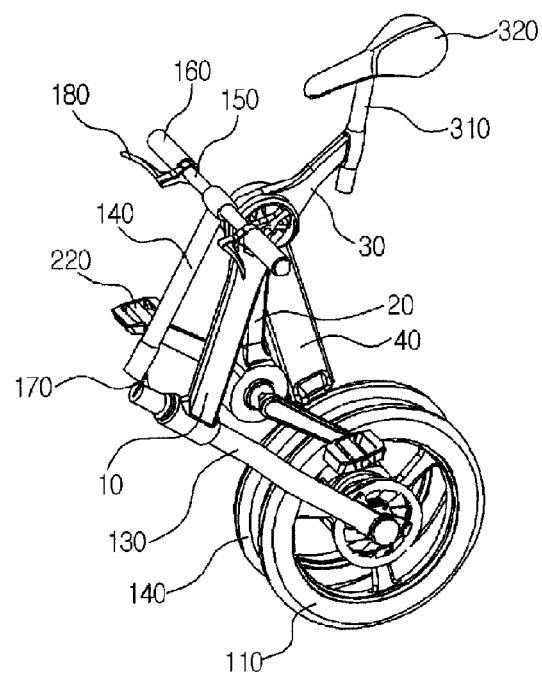
FIG. 11 is a perspective view illustrating a folded state of the folding type bicycle according to the illustrated embodiment of the present invention.

FIG. 1 is a perspective view of the folding type bicycle according to the illustrated embodiment of the present invention. FIG. 2 is a side view of the folding type bicycle shown in FIG. 1. FIG. 3 is a plan view of the folding type bicycle shown in FIG. 1. FIG. 5 is a plan view illustrating the frame included in the folding type bicycle in accordance with the illustrated embodiment of the present invention. FIG. 11 is a perspective view illustrating a folded state of the folding type bicycle according to the illustrated embodiment of the present invention.

As shown in FIGS. 1 to 3, and FIG. 5, the front wheel 110 and rear wheel 410 are arranged to be aligned with each other along a line D in a completely unfolded state of the bicycle. In a folded state, the front wheel 110 and rear wheel 410 are arranged in parallel, as shown in FIG. 11.

The reason why the front wheel 110 and rear wheel 410, which are aligned with each other along the line D in an unfolded state of the bicycle, are arranged in parallel in a folded state of the bicycle is that the hinge plates 11, 21, and 41 have a structure bent from one end of the frame 1, and are coupled to pivot about a single hinge shaft, namely, the hinge shaft 50, in a state of being in contact with one another while extending in parallel.

When the first hinge plate 11 and third hinge plate 41 are rotated about the second hinge plate 21 toward the ground, in order to fold the bicycle, a space, in which the front wheel 110 and rear wheel 410 are arranged in parallel, is formed between the end of the front frame 10 and the end of the rear frame 40 by virtue of the bending angle defined between the front frame 10 and the first hinge plate 11 and the bending angle defined between the rear frame 40 and the third hinge plate 41.

As shown in FIG. 3, the distance between a line A extending axially through the rotation axis of the front wheel 110 and a line C extending in parallel with the line A while passing through a point K where the hinge shaft 50 extending through the second hinge plate 21 meets the second hinge plate 21 may be equal to the distance between the line C and a line B extending axially through the rotation axis of the rear wheel 410.

As the distance between the lines A and C is equal to the distance between the lines A and B, the front wheel 110 and rear wheel 410 are positioned at the same level in a folded state of the bicycle.

Also, the center of the saddle 320 is positioned on the line D because the center frame 20, saddle frame 30, and second hinge plate 21 are integrated, and the second hinge plate 21 is arranged to be bent from one end of the saddle frame 30 by a predetermined angle.

Since the folding type bicycle according to the illustrated embodiment of the present invention has a structure in which the front frame 10, center frame 20, saddle frame 30, and rear frame 40 are pivotable about the common hinge shaft 50, as described above, the rider may easily fold the bicycle through simple manipulation. The bicycle has a minimal volume in a folded state. Also, the rider may conveniently carry the bicycle in a folded state.

Figure 12:
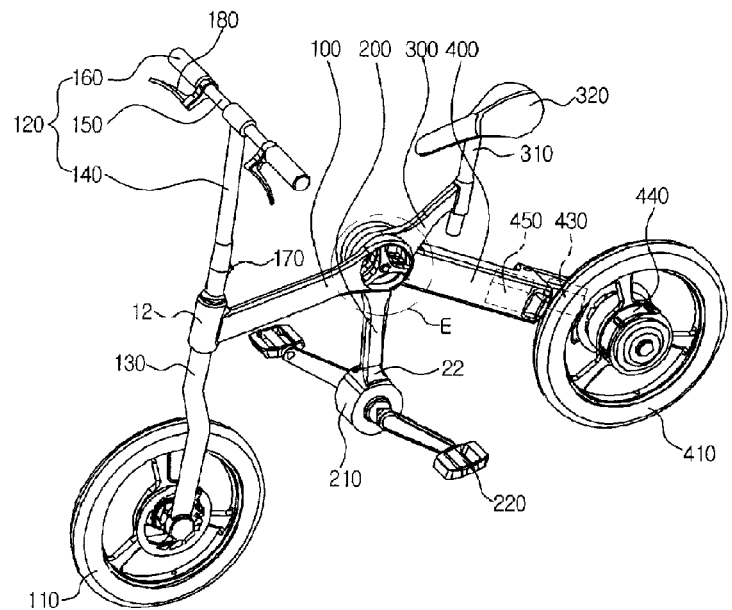
FIG. 12 is a perspective view of a folding type bicycle according to another exemplary embodiment of the present invention.
Figure 13:
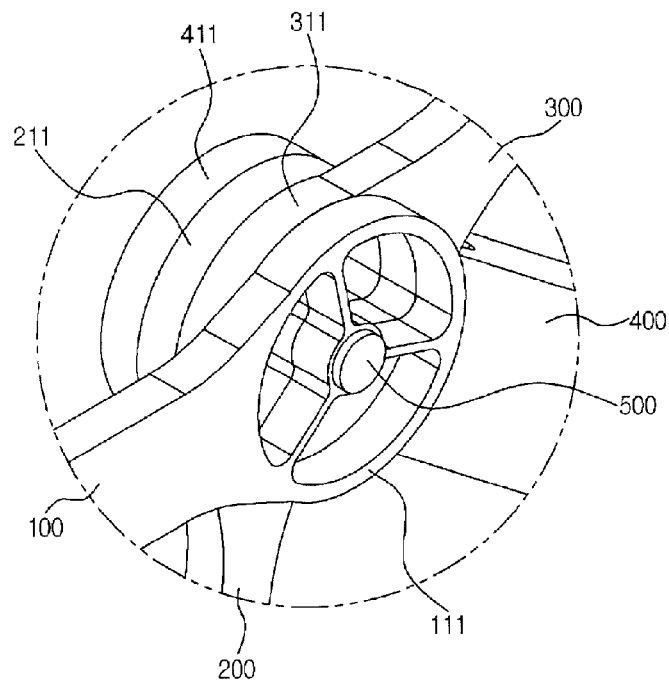
FIG. 13 is an enlarged perspective view illustrating a portion E in FIG. 12.

FIG. 12 is a perspective view of a folding type bicycle according to another exemplary embodiment of the present invention. FIG. 13 is an enlarged perspective view illustrating a portion E in FIG. 12.

As shown in FIGS. 12 and 13, the folding type bicycle according to another embodiment of the present invention includes a center frame 200 and a saddle frame 300, which are separate from each other.

A first hinge plate 111 is provided at one end of a front frame 100 such that it is bent from the front frame 100. A second hinge plate 211 is provided at one end of the center frame 200 such that it is bent from the center frame 200. A third hinge plate 311 is provided at one end of the saddle frame 300 such that it is bent from the saddle frame 300. A fourth hinge plate 411 is provided at one end of a rear frame 400 such that it is bent from the rear frame 400.

The first hinge plate 111, second hinge plate 211, third hinge plate 311, and fourth hinge plate 411 are pivotally coupled through a hinge shaft 500.

Other configurations of the folding type bicycle are identical to those of the folding type bicycle according to the previous embodiment of the present invention, so that no description thereof will be given.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A folding type bicycle comprising a frame, wherein:
the frame comprises a front frame, to which a front wheel and a handle are mounted, a center frame, to which pedals are mounted, and a rear frame, to which a rear wheel is mounted;
at least one of the front, center, and rear frames comprises a hinge plate bent from one end of the at least one frame; and
the front, center, and rear frames are pivotally coupled through the hinge plate, wherein
the center frame comprises a saddle frame to mount a saddle thereto;
the front frame comprises a first hinge plate;
the center and saddle frames comprise a second hinge plate in common; and
the rear frame comprises a third hinge plate.

2. The folding type bicycle according to claim 1, wherein the hinge plate is coupled through a hinge shaft.

3. The folding type bicycle according to claim 2, further comprising:
a fixing unit to prevent pivotal movement of the frames.

4. The folding type bicycle according to claim 3, wherein the fixing unit comprises:
a first cam member having a first mountain portion protruded from one surface of the first cam member, and a first valley portion formed at the surface of the first cam member while being adjacent to the first mountain portion; and
a second cam member having a second valley portion formed at one surface of the second cam member, to engage with the first mountain portion, and a second mountain portion formed at the surface of the second cam member, to engage with the first valley portion.

5. The folding type bicycle according to claim 4, wherein:
the first and second cam members are coupled to be pivotable about the hinge shaft; and
the second cam member is provided, at an outer circumferential surface thereof, with a lever to pivot the second cam member about the hinge shaft.

6. The folding type bicycle according to claim 5, wherein the lever comprises at least one bent portion.

7. The folding type bicycle according to claim 4, wherein the first cam member is coupled to one surface of the hinge plate, which is provided at the front or rear frame.

8. The folding type bicycle according to claim 7, wherein:
the first cam member comprises a fixing protrusion; and
the hinge plate, which is provided at the front or rear frame, comprises a fixing groove to engage with the fixing protrusion.

9. The folding type bicycle according to claim 4, wherein the first cam member is formed to be integrated with the hinge plate, which is provided at the front or rear frame.

10. The folding type bicycle according to claim 1, wherein the hinge plate is provided with a shaft hole to allow the hinge plate to be coupled with a hinge shaft.

11. The folding type bicycle according to claim 10, wherein:
a rotation preventing protrusion is formed at one of the hinge shaft and the shaft hole provided at the hinge plate; and
a rotation preventing groove having a shape corresponding to the rotation preventing protrusion is formed at the other one of the hinge shaft and the shaft hole.

12. The folding type bicycle according to claim 1, wherein a stopper is provided at the hinge plate, to limit a pivotal movement angle of the hinge plate.

13. The folding type bicycle according to claim 12, wherein:
the stopper comprises a protrusion protruded from one surface of the hinge plate, and a guide groove provided at an inner circumferential surface of the hinge plate; and
the guide groove comprises a guide rail to guide movement of the protrusion, and steps to limit the movement of the protrusion.

14. The folding type bicycle according to claim 1, further comprising:
an electric generator mounted to the center frame, to generate electrical energy during rotation of the pedals;
a motor mounted to the rear wheel;
a battery to store the electrical energy generated by the electric generator;
a battery management system to manage the battery; and
an electronic control unit (ECU) electrically connected to the electric generator, the motor, the battery, and the battery management system, wherein at least one of the electric generator, the battery, the battery management system, and the ECU is mounted to the rear frame.

15. The folding type bicycle according to claim 1, wherein the center and saddle frames are arranged to be spaced apart from each other about the second hinge plate by a predetermined angle.

16. The folding type bicycle according to claim 15, wherein at least two of the first, second, and third hinge plates are provided, at one-side surfaces thereof, with teeth, and are in contact with each other while engaging with each other through the teeth.

17. The folding type bicycle according to claim 2, wherein a distance between a rotation center of the front wheel and the hinge shaft is equal to a distance between the hinge shaft and a rotation center of the rear wheel.

18. The folding type bicycle comprising a frame, wherein:
the frame comprises a front frame, to which a front wheel and a handle are mounted, a center frame o which pedals are mounted, a saddle frame, to which a saddle is mounted, and a rear frame, to which a rear wheel is mounted;
at least one of the front, center, saddle and rear frames comprises a hinge plate bent from an associated one of the at least one frame; and
the front, center, saddle, and rear frames are pivotally coupled through the hinge plate, wherein
the front frame comprises a first hinge plate;
the center and saddle frames comprise a second hinge plate in common; and
the rear frame comprises a third hinge plate.

19. The folding type bicycle according to claim 18, wherein the center and saddle frames are arranged to be spaced apart from each other about the second hinge plate by a predetermined angle.

20. The folding type bicycle according to claim 19, wherein at least two of the first, second, and third hinge plates are provided, at one-side surfaces thereof, with teeth, and are in contact with each other while engaging with each other through the teeth.

21. A folding type bicycle comprising a frame, wherein:
the frame comprises a front frame, to which a front wheel and a handle are mounted, a center frame, to which pedals are mounted, and a rear frame, to which a rear wheel is mounted;
at least one of the front, center, and rear frames comprises a hinge plate bent from one end of the at least one frame; and the front, center, and rear frames are pivotally coupled through the hinge plate, wherein the center frame comprises a saddle frame to mount a saddle thereto;

the hinge plate is provided with a shaft hole to allow the hinge plate to be coupled with a hinge shaft;

a rotation preventing protrusion is formed at one of the hinge shaft and the shaft hole provided at the hinge plate; and a rotation preventing groove having a shape corresponding to the rotation preventing protrusion is formed at the other one of the hinge shaft and the shaft hole.

\* \* \* \* \*